(12) United States Patent
Kim et al.

(10) Patent No.: US 7,427,141 B2
(45) Date of Patent: Sep. 23, 2008

(54) MIRROR UNIT FOR AUTOMOBILE

(76) Inventors: Jong-Ho Kim, 203-701 Sin-seon Maeul Apt., Gwanjeo-dong, Seo-gu, Daejeon (KR) 302-783; Jong-Chan Kim, 109-60, Sanseong-dong, Jung-gu, Daejeon (KR) 301-817

( * ) Notice: Subject to any disclaimer, the term of this patent is extended or adjusted under 35 U.S.C. 154(b) by 0 days.

(21) Appl. No.: 11/663,217

(22) PCT Filed: Sep. 15, 2005

(86) PCT No.: PCT/KR2005/003064

§ 371 (c)(1),
(2), (4) Date: Mar. 20, 2007

(87) PCT Pub. No.: WO2006/033536

PCT Pub. Date: Mar. 30, 2006

(65) Prior Publication Data

US 2007/0263303 A1    Nov. 15, 2007

(30) Foreign Application Priority Data

Sep. 21, 2004  (KR) ............... 10-2004-0075665
Sep. 15, 2005  (KR) ............... 10-2005-0085996

(51) Int. Cl.
*G02B 5/08* (2006.01)
*G02B 7/182* (2006.01)
*B60R 1/04* (2006.01)
*B60R 1/06* (2006.01)

(52) U.S. Cl. ............ 359/840; 359/850; 359/876; 359/877; 359/605; 359/607

(58) Field of Classification Search ........... 359/605, 359/607, 840, 872, 877, 850, 855, 864, 865, 359/876

See application file for complete search history.

(56) References Cited

U.S. PATENT DOCUMENTS

| 1,864,015 | A | * | 6/1932 | Fotakis | 359/607 |
| 1,887,706 | A | * | 11/1932 | Bettman | 359/607 |
| 1,925,631 | A | * | 9/1933 | Fotakis | 359/607 |
| 2,307,532 | A | * | 1/1943 | Murphy | 359/607 |
| 2,989,896 | A | * | 6/1961 | Bertell | 359/607 |
| 3,493,295 | A | * | 2/1970 | Kobrehel | 359/840 |

(Continued)

FOREIGN PATENT DOCUMENTS

JP    60-236848    4/1998

(Continued)

OTHER PUBLICATIONS

International Search Report for PCT/KR2005/003064 mailed Feb. 28, 2006 (1 page).

*Primary Examiner*—Ricky D Shafer
(74) *Attorney, Agent, or Firm*—Osha Liang LLP

(57) ABSTRACT

Disclosed is a mirror unit for a vehicle, which includes a mirror case (10) having a receiving space formed therein; a pivoting bracket (20) axially coupled to an inside of the mirror case (10); a first operating unit (30) installed to a predetermined position in the mirror case (10) to rotate the pivoting bracket (20) as much as 180 degrees by one touch; and front and rear mirrors (40)(45) systematically attached and detached freely to/from both sides of the pivoting bracket (20).

13 Claims, 7 Drawing Sheets

U.S. PATENT DOCUMENTS

| | | | | |
|---|---|---|---|---|
| 3,666,354 A | * | 5/1972 | Russell | 359/604 |
| 4,103,560 A | * | 8/1978 | Stoffel et al. | 74/502.1 |
| 4,114,986 A | * | 9/1978 | Marcus | 359/607 |
| 4,486,075 A | * | 12/1984 | Cohen | 359/840 |
| 4,614,412 A | * | 9/1986 | Cohen | 359/840 |
| 5,751,490 A | * | 5/1998 | Johnson | 359/605 |
| 6,286,967 B1 | * | 9/2001 | Cainion | 359/871 |

FOREIGN PATENT DOCUMENTS

| | | |
|---|---|---|
| KR | 1998-0007550 | 4/1998 |
| KR | 1998-034078 | 9/1998 |
| KR | 1999-011642 | 3/1999 |
| KR | 20-0322009 | 7/2003 |

* cited by examiner

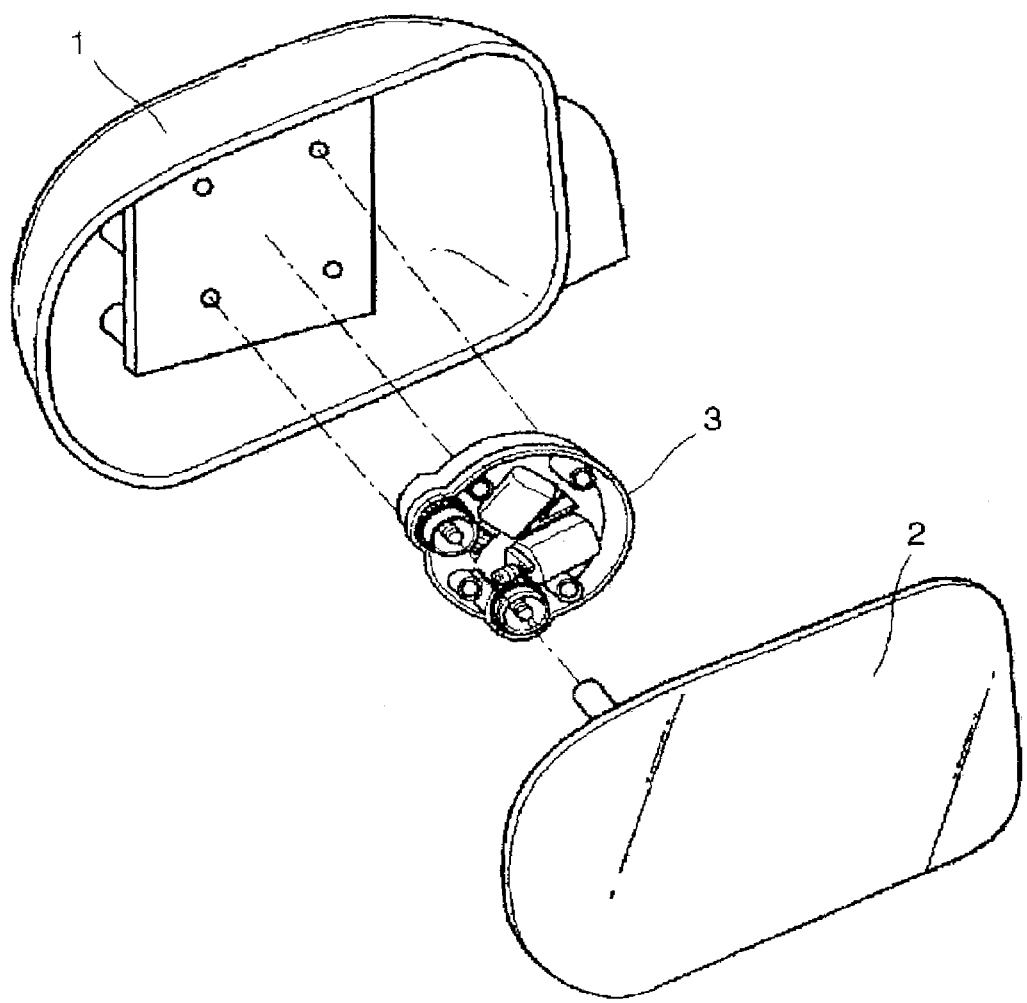
[Fig. 1]
PRIOR ART

[Fig. 2]
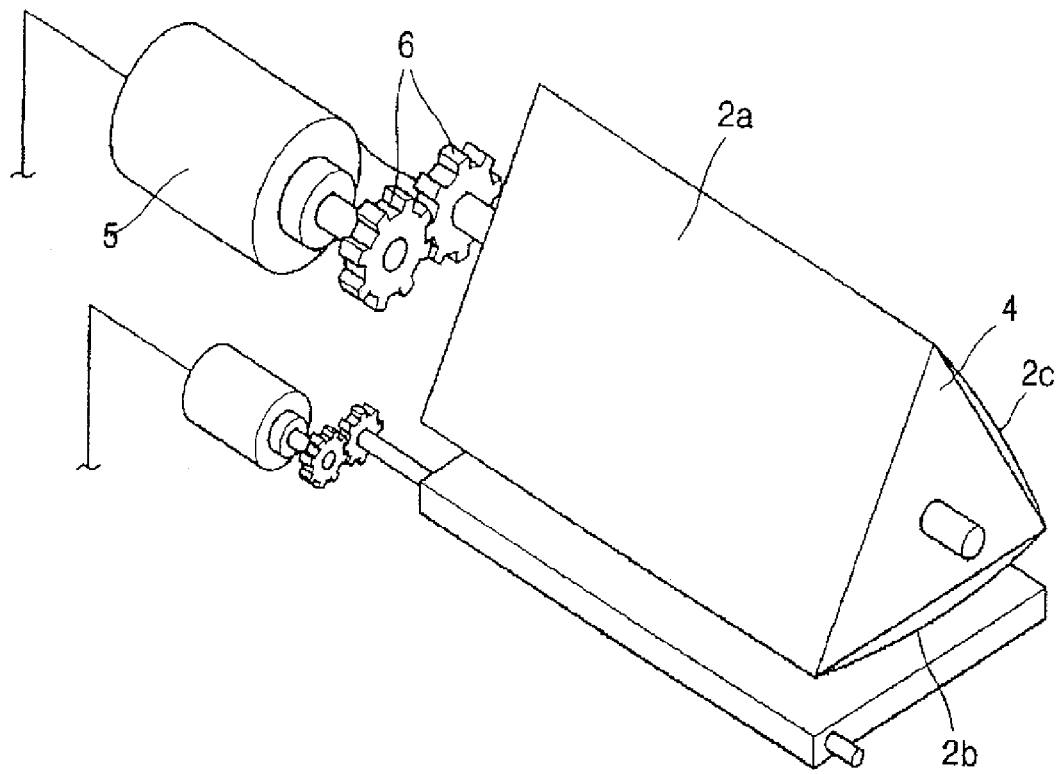
PRIOR ART

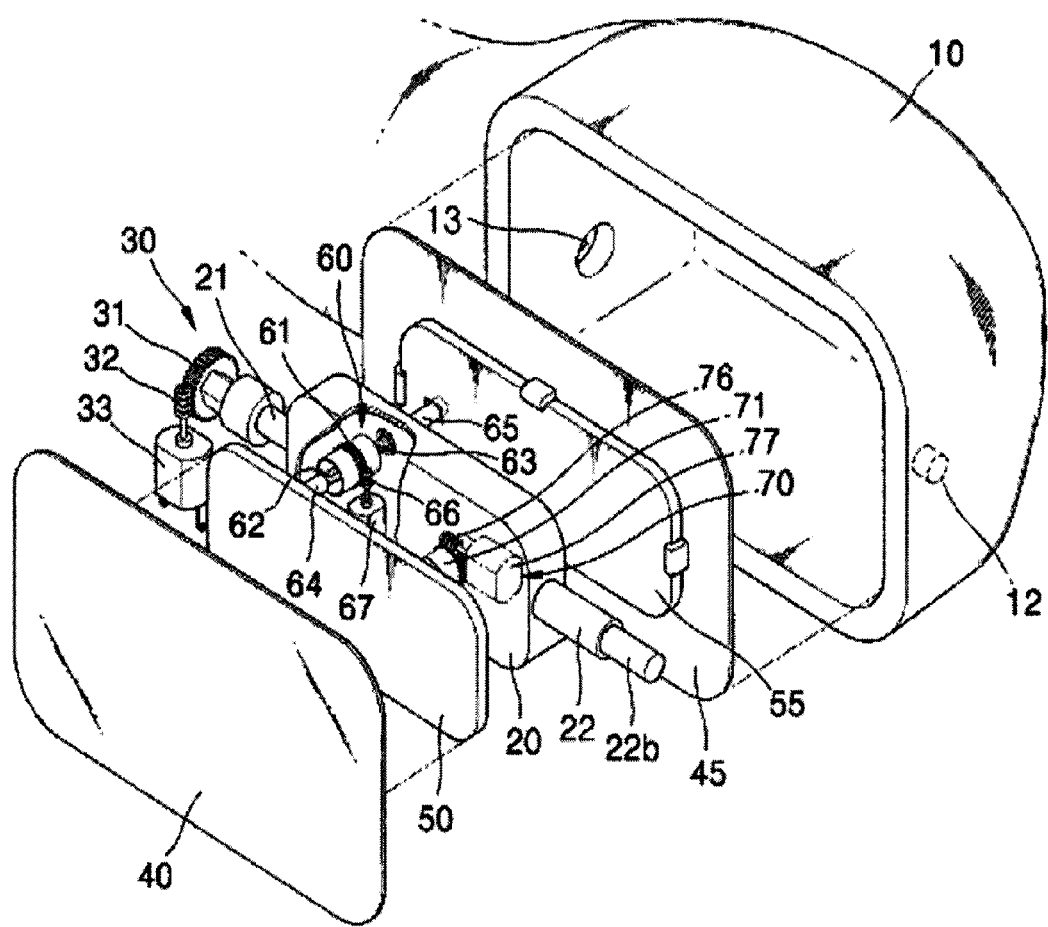
[Fig. 3]

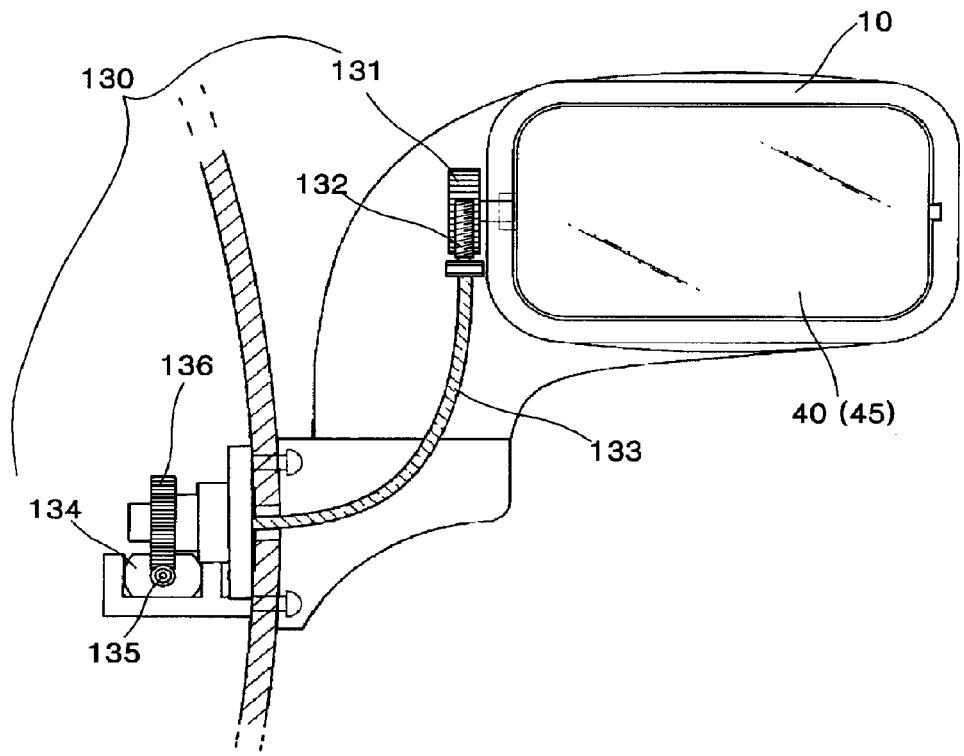
[Fig. 4]
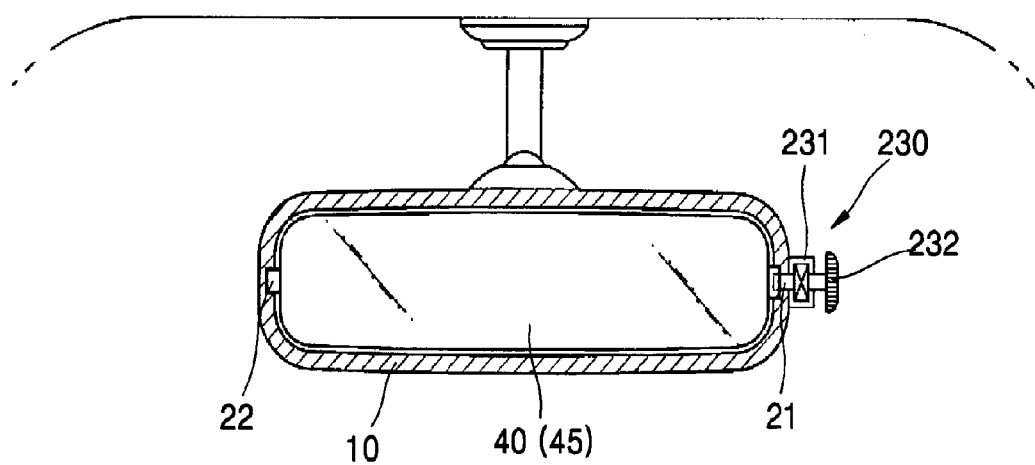
[Fig. 5]

[Fig. 6]
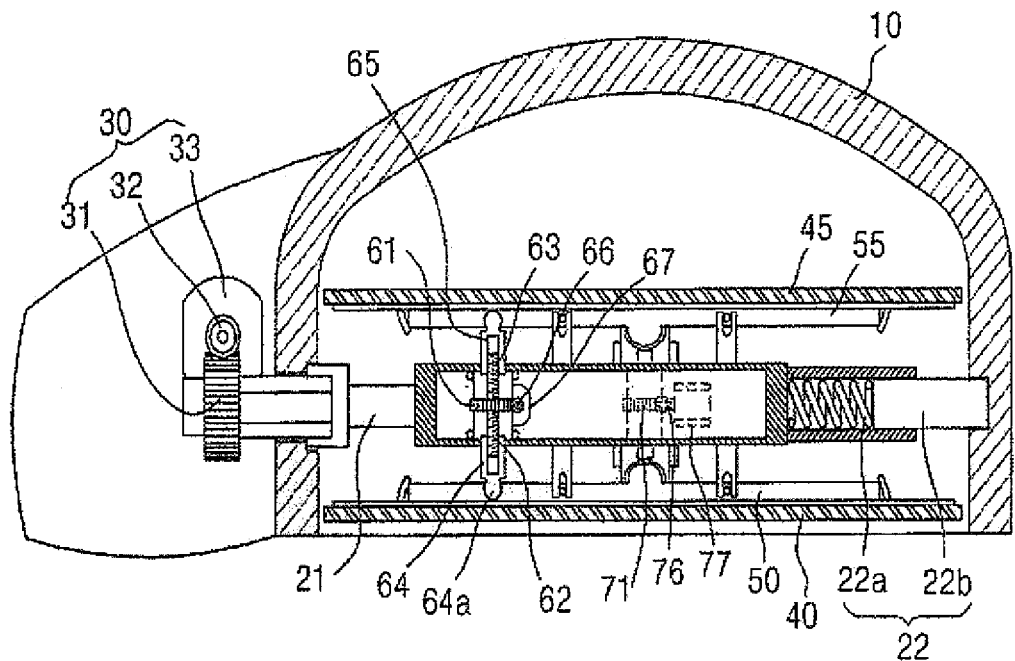
[Fig. 7]
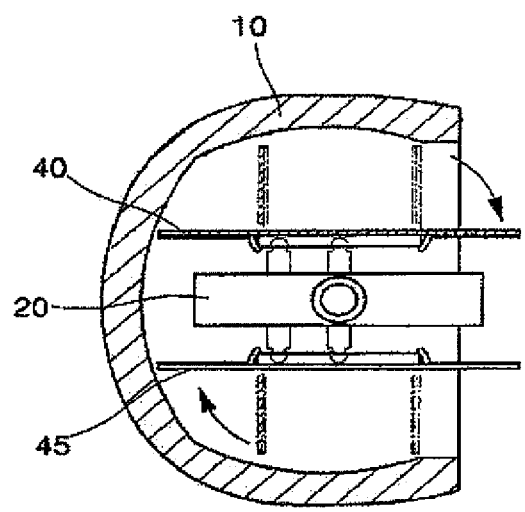

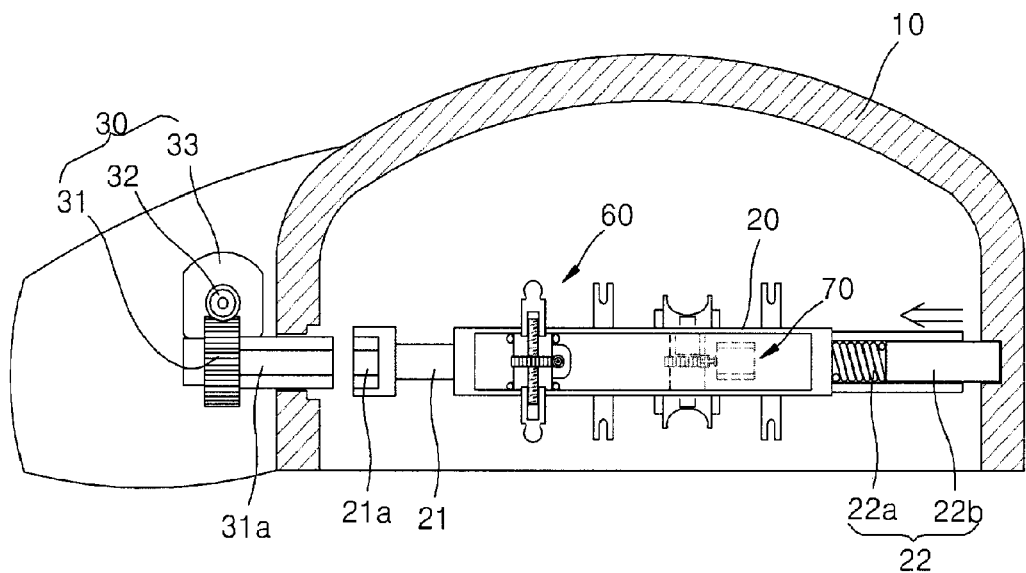
[Fig. 8]
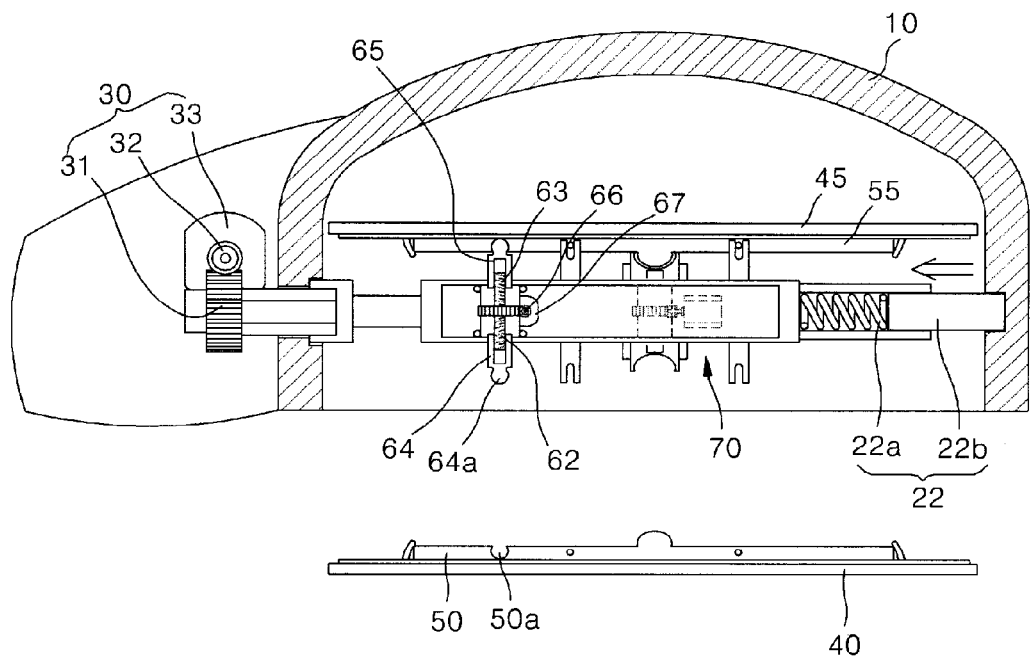
[Fig. 9]

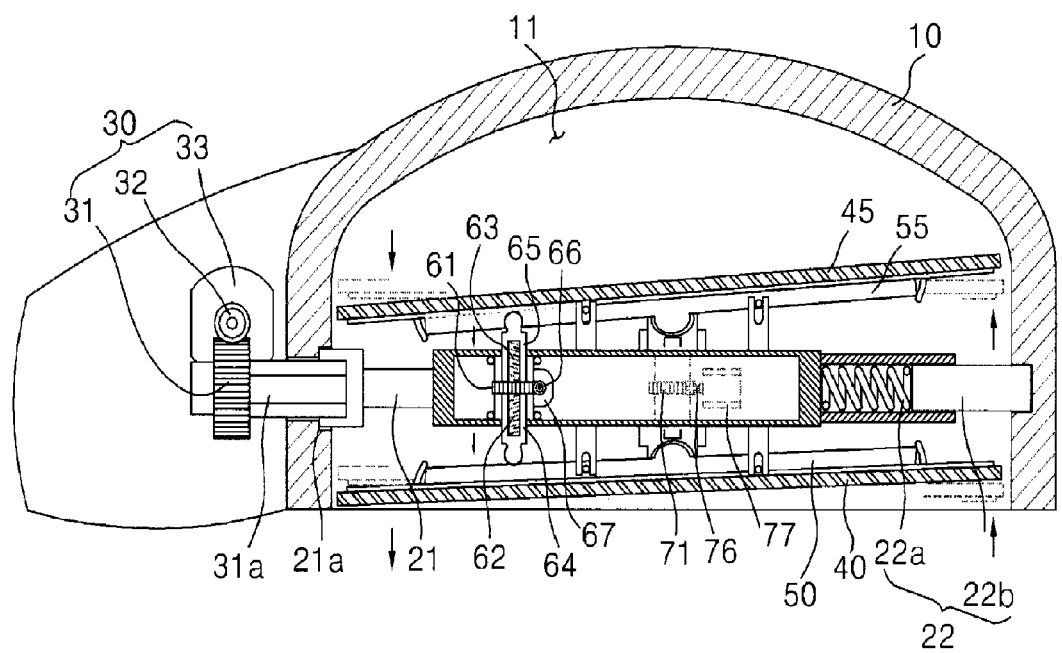
[Fig. 10]

US 7,427,141 B2

MIRROR UNIT FOR AUTOMOBILE

TECHNICAL FIELD

The present invention relates to a mirror unit used for a vehicle, and more particularly to a mirror unit that allows a user to select a mirror suitable for environments.

1. Background Art

A conventional mirror unit for a vehicle includes a mirror case 1 having a receiving space formed therein, a mirror 2 for reflecting an object, and an operating unit 3 installed in the mirror case 1 to pivot the mirror 2 in an upper, lower, right or left direction within a certain angle, as shown in FIG. 1. By using such configuration, a driver may control an angle of the mirror 2 by operating the operating unit 3.

However, in case of such a mirror unit, light emitted from a headlight of a vehicle positioned at the rear is directly reflected toward a driver, causing troubles in driving.

In the connection, a dark coating film is attached to the mirror 2 to decrease a magnitude of light reflected. However, the mirror should be also used in daytime, the mirror coated in a too dark color disturbs a driver to exactly recognize a status at the rear.

Thus, in order to overcome the above problem, as shown in FIG. 2, Korean Utility Model Registration No. 20-0322009, published on Jul. 23, 2003, discloses that mirrors 2a, 2b, 2c having different radii of curvature are attached to a rotating body 4 having a shape of triangular prism, and then the rotating body 4 is selectively rotated using a motor 5 and a gear 6 so that a mirror suitable for running environments may be used.

However, in this case, it is advantageous that the mirrors 2a, 2b, 2c attached on three surfaces of the rotating body 4, but disadvantageously it is impossible to control angles of the mirrors 2a, 2b, 2c attached to the rotating body 4.

2. Disclosure of Invention

Technical Problem

The present invention is designed to solve the above problems of the prior art, and therefore an object of the invention is to provide a mirror unit for a vehicle, which may allow a user to selectively use mirrors with different magnitudes of reflected light at night or daytime or depending on environment changes caused by weather.

Another object of the invention is to provide a mirror unit for a vehicle, having a mirror that may be pivoted an a predetermined angle in an upper, lower, right or left direction so that a user may control an angle of the mirror to fit a range of view to a best position.

Technical Solution

In order to accomplish the above object, the present invention provides a mirror unit for a vehicle, which includes:

a mirror case 10 having a receiving space formed therein; a pivoting bracket 20 axially coupled to an inside of the mirror case 10; a first operating unit 30 installed to a predetermined position in the mirror case 10 to rotate the pivoting bracket 20 as much as 180 degrees by one touch; and front and rear mirrors 40, 45 systematically attached and detached freely to/from both sides of the pivoting bracket 20.

In the present invention, the first operating unit 30 may include a worm wheel 31 coupled to one pivoting axis 21 of the pivoting bracket 20; a worm 32 coupled to the worm wheel 31; and a motor 33 for rotating the worm 32.

In the present invention, the first operating unit 130 may also include a worm wheel 131 coupled to one pivoting axis 21 of the pivoting bracket 20; a worm 132 coupled to the worm wheel 131; a power transmission wire 133 coupled to the worm 132; and a motor 134 for rotating the power transmission wire 133.

In the present invention, the first operating unit 230 may also include a latchet gear 231 coupled to one pivoting axis 21 of the pivoting bracket 20 to rotate in one direction; and a handle 232 connected to the latchet gear 231.

In the present invention, the mirror unit may further include front and rear mirror supports 50, 55 installed at front and rear of the pivoting bracket 20 and to which front and rear mirrors 40, 45 are respectively attached; a second operating unit 60 installed in the pivoting bracket 20 to pivot the front and rear mirror supports 50, 55 in right and left directions; and a third operating unit 70 installed in the pivoting bracket 20 to pivot the front and rear mirror supports 50, 55 in upper and lower directions.

In the present invention, the second operating unit 60 may include a worm wheel 61 installed at a position inclined left in the pivoting bracket 20 to be pivotable and having bolts 62, 63 protruded to both sides as a rotating axis; push sticks 64, 65 screwed to the bolts 62, 63 and connected to the front and rear mirror supports 50, 55; a worm 66 coupled to the worm wheel 61; and a motor 67 for rotating the worm 66 in clockwise and counterclockwise directions.

In the present invention, the third operating unit 70 may include a worm wheel 71 installed at a position inclined right in the pivoting bracket 20 to be pivotable and having bolts protruded to both sides as a rotating axis; push sticks screwed to the bolts and connected to the front and rear mirror supports 50, 55; a worm 76 coupled to the worm wheel 71; and a motor 77 for rotating the worm 76 in clockwise and counter-clockwise directions.

In the present invention, preferably, circular protrusions 64a are formed at an end of the push sticks, and circular grooves 50a are formed in the front and rear mirror supports 50, 55 so that the circular protrusions 64a are attached and detached thereto/therefrom.

In the present invention, preferably, a coating layer is formed on at least one of the front and rear mirrors 40, 45 to decrease reflexibility of light thereof.

In the present invention, the front and rear mirrors 40, 45 have radii of curvature different from each other.

In the present invention, preferably, a polygonal groove 21a is formed at an end of the first pivoting axis 21 formed at one side of the pivoting bracket 20, and a first polygonal shaft 31a is formed at an axis of the worm wheel 31 so as to be inserted into the polygonal groove 21a.

In the present invention, preferably, a second pivoting shaft 22 including a second axis 22b elastically biased by a spring 22a installed therein to be protruded and inserted into a second groove 12 is formed at the other side of the pivoting bracket 20.

BRIEF DESCRIPTION OF THE DRAWINGS

FIG. 1 shows an example of a conventional mirror unit for a vehicle;

FIG. 2 shows another example of a conventional mirror unit for a vehicle;

FIG. 3 is an exploded perspective view showing a mirror unit for a vehicle according to the present invention;

FIG. 4 is a diagram showing an operating unit adopted in the mirror unit for a vehicle according to a second embodiment of the present invention;

FIG. 5 is a diagram showing an operating unit adopted in the mirror unit for a vehicle according to a third embodiment of the present invention;

FIG. 6 is a front view showing an inner configuration of the mirror unit for a vehicle of FIG. 3;

FIG. 7 is a diagram illustrating how a mirror is pivoted by a first operating unit in the mirror unit for a vehicle of FIG. 3;

FIG. 8 is a diagram illustrating that a pivoting bracket is separated from a mirror case in the mirror unit for a vehicle of FIG. 3;

FIG. 9 is a diagram illustrating that a mirror support is separated from a push stick in the mirror unit for a vehicle of FIG. 3; and FIG. 10 is a diagram illustrating that the mirror is pivoted at a predetermined angle by a second operating unit in the mirror unit for a vehicle of FIG. 3.

BEST MODE FOR CARRYING OUT THE INVENTION

Hereinafter, a mirror unit for a vehicle according to the present invention will be described in detail with reference to the accompanying drawings.

FIG. 3 is an exploded perspective view showing a mirror unit for a vehicle according to the present invention; FIG. 4 is a diagram showing an operating unit adopted in the mirror unit for a vehicle according to a second embodiment of the present invention; FIG. 5 is a diagram showing an operating unit adopted in the mirror unit for a vehicle according to a third embodiment of the present invention; FIG. 6 is a front view showing an inner configuration of the mirror unit for a vehicle of FIG. 3; FIG. 7 is a diagram illustrating how a mirror is pivoted by a first operating unit in the mirror unit for a vehicle of FIG. 3; FIG. 8 is a diagram illustrating that a pivoting bracket is separated from a mirror case in the mirror unit for a vehicle of FIG. 3; FIG. 9 is a diagram illustrating that a mirror support is separated from a push stick in the mirror unit for a vehicle of FIG. 3; and FIG. 10 is a diagram illustrating that the mirror is pivoted at a predetermined angle by a second operating unit in the mirror unit for a vehicle of FIG. 3.

As shown in FIG. 3, the mirror unit for a vehicle according to the present invention includes a mirror case 10 having a receiving space formed therein; a pivoting bracket 20 axially coupled to an inside of the mirror case 10; a first operating unit 30 installed to a predetermined position in the mirror case 10 to rotate the pivoting bracket 20 as much as 180 degrees by one touch; and front and rear mirrors 40, 45 systematically attached and detached freely to/from both sides of the pivoting bracket 20.

A through hole 13 is formed in one inner side of the mirror case 10, and a groove 12 is formed in the other side.

A first pivoting shaft 21 is formed at one side of the pivoting bracket 20 to pivot the pivoting bracket 20 so that the first pivoting shaft 21 passes through the through hole 13 of the mirror case, and a second pivoting shaft 22 supported by the groove 12 is formed at the other side.

More specifically, a polygonal groove 21a is formed at one end of the first pivoting shaft 21 formed at one side of the pivoting bracket 20, and a first axis 31a inserted into the polygonal groove 21a is formed on the axis of the worm wheel 31. In addition, the second pivoting shaft 22 includes a second axis 22b that is elastically biased by a spring 22a installed therein to be protruded and inserted into the groove 12.

In this connection, as shown in FIG. 8, if the mirror is kept in parallel to the ground (rotated as much as 90 degrees) and then the second axis 22b is pushed in an arrow direction (left), the second axis 22b is elastically biased by the spring 22a and then immersed into the second pivoting shaft 22, so the second axis 22b comes out of the second groove 12. In this connection, the pivoting bracket 20 may be separated from the mirror case 10, and the mirror mounted to the pivoting bracket 20 may be exchanged as desired. In case the pivoting bracket 20 is installed, the second axis 22b is inserted into the second groove 12 of the mirror case 10 again with the second axis 22b being immersed into the second pivoting shaft 22.

The first operating unit 30 pivots in the mirror case 10 the pivoting bracket 20 to which the front and rear mirrors 40, 45 are systematically detachably mounted, so that the front mirror 40 and the rear mirror 45 may be used as necessary. This first operating unit 30 may be configured in various ways, which will be described below in detail.

As a first embodiment, the first operating unit 30 includes a worm wheel 31 coupled to one pivoting axis 21 of the pivoting bracket 20; a worm 32 coupled to the worm wheel 31; and a motor 33 for rotating the worm 32, as shown in FIG. 3. In this connection, the worm 32 rotated by the motor 33 rotates the worm wheel 31, and thus the mirrors 40, 45 systematically detachably mounted to the pivoting bracket 20 are pivoted as shown in FIG. 7.

As a second embodiment, the first operating unit 130 includes a worm wheel 131 coupled to one pivoting axis 21 of the pivoting bracket 20; a worm 132 coupled to the worm wheel 131; a power transmission wire 133 coupled to the worm 132; and a motor 134 for rotating the power transmission wire 133, as shown in FIG. 4. At this time, a worm 135 and a worm wheel 136 mentioned above are installed between the motor 134 and the power transmission wire 133. In this connection, if the motor 134 gives a rotational force, the rotational force of the motor is transferred to the worm 132 through the power transmission wire 133, and the worm 132 rotates the worm wheel 131, thereby pivoting the pivoting bracket 20 to which the front and rear mirrors are mounted.

As a third embodiment, the first operating unit 230 includes a latchet gear 231 coupled to one pivoting axis 21 of the pivoting bracket 20 to rotate in one direction; and a handle 232 connected to the latchet gear 231, as shown in FIG. 5. In this connection, as a driver manipulates the handle 232, the pivoting bracket 20 to which the front and rear mirrors are mounted is pivoted. This first operating unit according to the third embodiment may be preferably used when the mirror unit of the present invention is used as a room mirror.

A dark coating layer (not shown) is formed on at least one of the front and rear mirrors 40, 45. The mirror with the dark coating layer is usually used at night, and it decrease magnitude of light emitted from a vehicle at the rear in the night running, thereby lessening dazzling of the driver to protect sight and assist in safe driving. On the contrary, an uncoated mirror is usually used at daytime so that a driver may look a backward status more clearly during driving. In addition, the front and rear mirror 40, 45 has different radii of curvature from each other, so a mirror suitable for running environments may be selectively used. Moreover, since there are provided the front mirror 40 and the rear mirror 45, though any mirror is broken, the other one may be still used.

Front and rear mirror supports 50, 55 to which front and rear mirrors 40, 45 are respectively attached are installed at front and rear of the pivoting bracket 20, as shown in FIG. 6. The front and rear mirror supports 50, 55 are pivoted in an upper, lower, right or left direction within a predetermined range. For this purpose, there are installed a second operating unit 60 installed in the pivoting bracket 20 to pivot the front and rear mirror supports 50, 55 in right and left directions, and a third operating unit 70 installed in the pivoting bracket 20 to pivot the front and rear mirror supports 50, 55 in upper and lower directions.

The second operating unit 60 includes a worm wheel 61 installed at a position inclined left in the pivoting bracket 20 to be pivotable and having bolts 62, 63 protruded to both sides as a rotating axis, push sticks 64, 65 screwed to the bolts 62, 63 and connected to the front and rear mirror supports 50, 55, a worm 66 coupled to the worm wheel 61, and a motor 67 for rotating the worm 66 in clockwise and counter-clockwise directions. In this connection, the worm 66 rotated by the motor 67 rotates the worm wheel 61, and the bolts 62, 63 rotated by the worm wheel 61 move the push sticks 64, 65, thereby pivoting the front and rear mirror supports 50, 55 in right and left directions within a predetermined angle.

The third operating unit 70 is substantially identical to the second operating unit 60, except that the worm wheel 71 is pivotally installed at a position inclined lower in a right direction in the pivoting bracket 20. This third operating unit 70 has bolts as a rotating axis of the worm wheel 71, and push sticks connected to the front and rear mirror supports 50, 55 are screwed to the bolts, and a worm 76 rotated by a motor 77 is coupled to the worm wheel 71. In this connection, the worm 76 rotated by the motor 77 rotates the worm wheel 71, and the bolts rotated by the worm wheel 71 move the push sticks, resultantly pivoting the front and rear mirror supports 50, 55 in upper and lower directions.

Here, a circular protrusion is formed at the end of the push stick, and a circular groove is formed in the front or rear mirror support so that the circular protrusion may be attached or detached to/from the circular groove. In this embodiment, the circular protrusion and the circular groove are specifically shown in FIG. 9 where reference number 64a denotes the circular protrusion and reference numeral 50a denotes the circular groove. In this connection, the front and rear mirror supports 50, 55 are separated from the circular protrusion of the push sticks when being pulled, while the circular protrusion 64a is inserted into the circular groove 50a when the front and rear mirror supports are inserted into the push sticks, to the contrary.

Now, operation of the mirror unit for a vehicle configured as above is described in detail.

When it is desired to shift from the front mirror 40 to the rear mirror 45 due to the change of driving environments, the first operating unit 30, 130, 230 is operated to pivot the pivoting bracket 20 as much as 180 degrees by one touch, as shown in FIG. 7.

In order to control angles of the front and rear mirrors 40, 45, in this embodiment, the second operating unit 60 is operated to control angles only in right and left directions, as shown in FIG. 10. That is to say, the worm 66 rotated by the motor 67 rotates the worm wheel 61, and the bolts 62, 63 rotated by the worm wheel 61 move the push sticks 64, 65 in the arrow direction, so it is resultantly possible to control angles of the front and rear mirrors 40, 45 attached to the front and rear mirror supports 50, 55 in right and left directions. In addition, in order to control angles of the front and rear mirrors 40, 45, the third operating unit 70 is operated.

In addition, after a driver controls the front mirror 40 into an angle most suitable for driving, the driver need not control an angle since the angle is not changed though the pivoting bracket 20 is rotated as much as 180 degrees by one touch by means of the first operating unit 30, 130, 230.

INDUSTRIAL APPLICABILITY

As described above, the mirror unit for a vehicle according to the present invention allows a driver to select and use one of the front and rear mirrors depending on day/night or environmental changes due to the weather since the front and rear mirrors are freely detachably attached at front and rear of the pivoting bracket pivoted in the mirror case.

In addition, since two sheets of mirrors are provided, though one mirror is broken, the other one may be used as a spare, so the driver may keep driving without any disturbance.

In addition, while a conventional mirror unit for a vehicle should be exchanged as a whole to cause inconvenience and financial loss when a mirror is broken, the mirror unit for a vehicle according to the present invention allows exchange of only a broken mirror to give better economic advantages.

In addition, when a vehicle is used at winter, the mirror unit of the present invention need not remove frost from the front mirror since frost is not formed on the front mirror. Moreover, in case mirrors coated with various colors are attached to the mirror unit, a driver may use a desired mirror according to his/her taste.

The invention claimed is:

1. A mirror unit for a vehicle, comprising:
   a mirror case having a receiving space formed therein;
   a pivoting bracket axially coupled to an inside of the mirror case;
   a first operating unit installed to a predetermined position in the mirror case to rotate the pivoting bracket as much as 180 degrees by one touch;
   front and rear mirrors systematically attachable to and detachable from both sides of the pivoting bracket;
   front and rear mirror supports installed at front and rear sides of the pivoting bracket, wherein the front and rear mirrors are attached to the front and rear mirror supports, respectively; and
   a second operating unit installed in the pivoting bracket to pivot the front and rear mirror supports in right and left directions.

2. The mirror unit for a vehicle according to claim 1, wherein the first operating unit includes: a worm wheel coupled to one pivoting axis of the pivoting bracket; a worm coupled to the worm wheel; and a motor for rotating the worm.

3. The mirror unit for a vehicle according to claim 1, wherein the first operating unit includes: a worm wheel coupled to one pivoting axis of the pivoting bracket; a worm coupled to the worm wheel; a power transmission wire coupled to the worm; and a motor for rotating the power transmission wire.

4. The mirror unit for a vehicle according to claim 1, wherein the first operating unit includes: a latchet gear coupled to one pivoting axis of the pivoting bracket to rotate in one direction; and a handle connected to the latchet gear.

5. The mirror unit for a vehicle according to claim 1, further comprising a third operating unit installed in the pivoting bracket to pivot the front and rear mirror supports in upper and lower directions.

6. The mirror unit for a vehicle according to claim 5, wherein the second operating unit includes: a worm wheel installed at a position inclined left in the pivoting bracket to be pivotable and having bolts protruded to both sides as a rotating axis; push sticks screwed to the bolts and connected to the front and rear mirror supports; a worm coupled to the worm wheel; and a motor for rotating the worm in clockwise and counterclockwise directions.

7. The mirror unit for a vehicle according to claim 5, wherein the third operating unit includes: a worm wheel installed at a position inclined right in the pivoting bracket to be pivotable and having bolts protruded to both sides as a rotating axis; push sticks screwed to the bolts and connected to the front and rear mirror supports; a worm coupled to the worm wheel; and a motor for rotating the worm in clockwise and counterclockwise directions.

8. The mirror unit for a vehicle according to claim 7, wherein circular protrusions are formed at an end of the push sticks, and circular grooves are formed in the front and rear mirror supports so that the circular protrusions are attached thereto and detached therefrom.

9. The mirror unit for a vehicle according to claim 6, wherein circular protrusions are formed at an end of the push sticks, and circular grooves are formed in the front and rear mirror supports so that the circular protrusions are attached thereto and detached therefrom.

10. The mirror unit for a vehicle according to claim 1, wherein a coating layer is formed on at least one of the front and rear mirrors to decrease reflexibility of light thereof.

11. The mirror unit for a vehicle according to claim 1, wherein the front and rear mirrors have radii of curvature different from each other.

12. The mirror unit for a vehicle according to claim 1, wherein a polygonal groove is formed at an end of a first pivoting axis formed at one side of the pivoting bracket, and a first polygonal shaft is formed at an axis of a worm wheel coupled to one pivoting axis of the pivoting bracket so as to be inserted into the polygonal groove.

13. The mirror unit for a vehicle according to claim 1, wherein a second pivoting shaft including a second axis elastically biased by a spring installed therein to be protruded and inserted into a second groove is formed at one side of the pivoting bracket.

* * * * *